(No Model.)

F. H. HEIMSATH.
WINDOW PLATFORM AND FIRE ESCAPE.

No. 266,691. Patented Oct. 31, 1882.

Witnesses:
Jacob Lorum.
H. Heuchl.

Inventor:
Frank H Heimsath
By Wm H Lotz
Attorney.

N. PETERS. Photo-Lithographer, Washington, D. C.

United States Patent Office.

FRANK H. HEIMSATH, OF CHICAGO, ILLINOIS.

WINDOW-PLATFORM AND FIRE-ESCAPE.

SPECIFICATION forming part of Letters Patent No. 266,691, dated October 31, 1882.

Application filed July 5, 1882. (No model.)

*To all whom it may concern:*

Be it known that I, FRANK H. HEIMSATH, of Chicago, in the county of Cook and State of Illinois, have invented certain new and useful Improvements in Window-Platform and Fire-Escape Combined; and I do hereby declare that the following is a full, clear, and exact description thereof, reference being had to the accompanying drawings, and to the letters of reference marked thereon, which form a part of this specification.

The object of my invention is to produce a scaffold that can be attached to a window-sill, so as to form a platform exterior of the window, that is provided with a railing, and is adapted for a person to stand upon while cleaning the windows, such scaffold at the same time to answer as a fire-escape for attaching a rope ladder. Therefore my invention consists of the novel devices and combinations of devices hereinafter described and specifically claimed.

Figure 1:
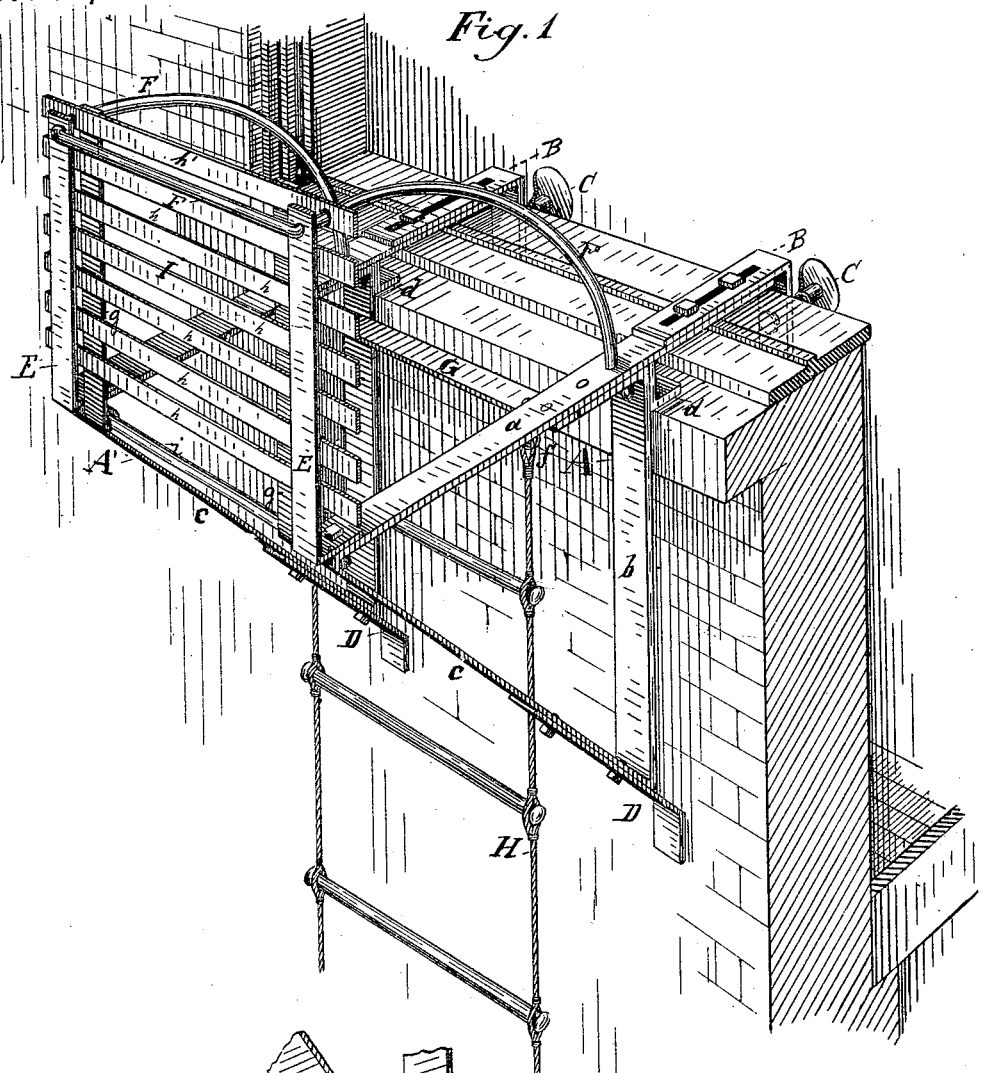
Figure 2:
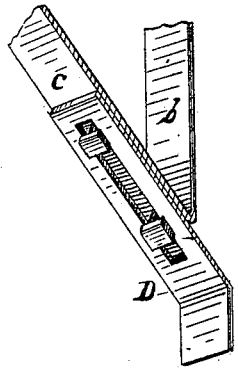

In the accompanying drawings, Figure 1 represents a perspective view of the apparatus as used for a fire-escape, and Fig. 2 a similar view of the adjustable brace-foot.

Corresponding letters in the several figures of the drawings designate like parts.

A and A' are two frames, of triangular shape, that are bent each of a bar of flat iron, and of which $a$ denotes the horizontal shank, $b$ the perpendicular shank, and $c$ the brace. The end of shank $b$ is bent again to lap under shank $a$, and is connected therewith by rivets, while the inward end of such horizontal shank $a$ is extended to reach over the window-sill, where each bar has adjustably secured by screw-bolts a slotted L-plate, B, the pending shank of which is tapped for tightening screw C, that is to be turned against the window-frame for rigidly attaching the scaffold. An angle-plate, $d$, is riveted against each shank $b$ of frames A and A', under shank $a$, that will form a foot-support upon the outer edge of the window-sill. Against the lower end of brace $c$ of each frame A and A' is secured by screw-bolts a slotted angle-plate, D, which is to rest against the outer face of the building-wall, and is adjusted to sustain the bar $a$ of the frames on a horizontal position. Upon the exterior end of each frame A and A' is secured a vertical bar, E, the lower end of which is bent rectangular and is riveted or bolted upon shank $a$ of such frame. The upper end of each bar E has a punch-hole and a brace-bar, F, of round iron, that is first bent ⊔ shape, is passed with its side shanks through the punch-holes of both bars E, so as to provide a rigid connection between bars E. The two side shanks of bar F are curved downward, each to form a quarter-circle, and their ends are riveted to the top bars of frames A and A'. The upright bars E and the brace-bar F will thus form a strong railing. Another lateral bar, G, is secured with its end under shanks $a$ of frames A and A', thus rigidly connecting these frames, and this bar G is provided with two hooks, $f$, to which the rope ladder H is or may be suspended.

A grate, I, is composed of two longitudinal bars, $g$, connected by a series of lateral bars, $h$, that are riveted thereto, so as to form a platform. The two bars $g$ have each an eye to one end, by which they are pivoted upon a rod, $i$, that is secured between the extreme outward ends of frames A and A'. The most inward lateral bar, $h'$, has holes drilled through its ends, through which the curved shanks of brace-bar F are passed in a manner that such platform, while being swung in either direction, will follow the line of such curved braces, and will be steadied thereby. Such platform I is turned down flat upon frames A and A' as long as the apparatus is to be used as a window-platform for a person to stand upon, but will be turned upward to lean against the standards E when the ladder H is to be attached and the apparatus is to be used as a fire-escape, so as to provide sufficient room for a person to climb down upon the ladder.

The whole apparatus is to be made of steel or wrought-iron, so as to combine the greatest strength with the least weight, and that it can be handled and attached easy by a single person.

The L-plate B, as well as the angle-plate D, being adjustable, the scaffold can be made to fit any building, and the whole device is very convenient for cleaning the windows, and is a safeguard for the inhabitants of the house in case of fire.

What I claim is—

1. A window-scaffold consisting of two triangular frames, A and A', each composed of shanks $a$ and $b$ and brace $c$, and connected by bars or rods G and $i$, and provided with adjustable L-plates B, having fastening-screws C, and with adjustable angle-plates D, all substantially as and for the purpose set forth.

2. A window-scaffold consisting of two triangular frames, A and A', each composed of shanks $a$ and $b$ and brace $c$, and provided with adjustable L-plates B, having fastening-screws C, and with adjustable angle-plates D, and being connected by bar G, having hooks $f$ for suspending ladder H, the whole being constructed and arranged substantially in the manner set forth.

3. A window-platform consisting of two triangular frames, A and A', that are provided with adjustable L-plates B, having fastening-screws C, and with adjustable angle-plates D, such frames being connected by a rod, $i$, that forms the pivot for a platform, I, and by a bar, G, that has hooks $f$ for suspending ladder H, the whole being arranged to operate substantially in the manner and for the purpose described and shown.

4. A window-platform consisting of two triangular frames, A and A', that are provided with adjustable L-plates B, having fastening-screws C, with adjustable angle-plates D, and with standard-bars E and braces F, that are connected by bar G, having hooks $f$, and by rod $i$, which forms the pivot for platform I, the whole being constructed and arranged substantially as and for the purpose set forth.

In testimony that I claim the foregoing as my invention I affix my signature in presence of two witnesses.

FRANK H. HEIMSATH.

Witnesses:
RICHARD G. SCHMID,
H. HUEHL.